United States Patent [19]

Achelpohl

[11] 4,289,567

[45] Sep. 15, 1981

[54] APPARATUS FOR APPLYING WEB SECTIONS TO A FLAT-LYING WORKPIECE

[75] Inventor: Fritz Achelpohl, Lengerich, Fed. Rep. of Germany

[73] Assignee: Windmoller & Holscher, Lengerich, Fed. Rep. of Germany

[21] Appl. No.: 54,914

[22] Filed: Jul. 5, 1979

[30] Foreign Application Priority Data

Jul. 24, 1978 [DE] Fed. Rep. of Germany ....... 2832391

[51] Int. Cl.[3] ........................ B32B 31/18; B32B 31/20; B32B 35/00

[52] U.S. Cl. .................................... 156/517; 156/521; 156/538; 156/556; 156/557

[58] Field of Search ............... 156/517, 519, 521, 497, 156/538, 552, 556, 557

[56] References Cited

U.S. PATENT DOCUMENTS

| | | | |
|---|---|---|---|
| 3,713,948 | 1/1973 | Kluger | 156/521 |
| 3,874,976 | 4/1975 | MacFarland | 156/517 |

*Primary Examiner*—Caleb Weston

*Attorney, Agent, or Firm*—Fleit & Jacobson

[57] ABSTRACT

Sections intermittently severed from a web and conveyed by spaced parallel suction belts of a conveyor are applied to successive workpieces by a transfer mechanism comprising parallel suction bars insertable between and beyond the suction belts.

7 Claims, 3 Drawing Figures

APPARATUS FOR APPLYING WEB SECTIONS TO A FLAT-LYING WORKPIECE

The invention relates to an apparatus for applying a section severed from a web withdrawn from a supply reel onto a flat-lying workpiece, comprising an intermittently driven pair of rollers that feeds the web to clamping jaws which are arranged at both sides thereof, are displaceable towards and away from each other and are respectively divided into a gap which extends transversely to the feeding direction of the web, is disposed in a common plane and guides a knife for severing web sections, and a conveyor which is disposed in front of the clamping jaws as viewed in the direction of web feed and brings the section to a position in which transfer means receive it and place it on the flat-lying workpiece.

In, for example, the production of sacks from tube sections, it is necessary for the purpose of making sealed bases to apply internal locks onto the pulled-open bases, which locks cover the inner edges of the corner folds, are connected along their edge to the corner folds and the side folds of the pulled-open base by adhesion or welding and are folded inwardly together with the side folds, or to close the bases that have been shut by folding over the side folds by means of applied base cover sheets. In the production of sacks and bags it is also necessary for carrying out other production steps to apply sections severed from a web, for example reinforcing sheets or valve labels, to a web of material or to workpieces.

In an apparatus of the aforementioned kind known from DE-AS No. 19 24 109 for making sacks from tube sections of thermoplastic material having a prismatic shape in the filled condition, the base sheets to be applied to the pulled-open bases of the continuously conveyed tube sections are, after being severed from the web, deposited on a conveyor belt which extends at right-angles to the conveying direction of this web parallel to the tube sections and substantially in the plane of their pulled-open bases and are held thereon by a belt which runs along therewith but can be lifted therefrom. Suckers running along therewith suction-attract the base sheets and, after venting the pressure belt, swing them onto the open bases conveyed in a plane parallel to the conveyor belt conveying the base sheets. By reason of the conveying and pressure belts for the base sheets continuously running along with the tube sections and because of the pivotable suckers, the known apparatus is not only expensive but it also fails to ensure that the base sheets do not slip during depositing on the travelling conveyor, during transport as well as during removal by the suckers and depositing onto the pulled-open bases, so that it is not certain that they will be properly located on the pulled-open bases.

It is therefore the problem of the present invention to provide an apparatus of the aforementioned kind by which sections severed from a web withdrawn from a supply reel can be properly located with the aid of simple means on the flat-lying workpieces to be processed.

According to the invention, this problem is solved in that the conveyor consists of a suction belt conveyor with a plurality of spaced parallel suction belts and the transfer means consist of a punch carrying at its front suction bars which are parallel to the suction belts, that the workpiece is held above the suction belt conveyor in a plane parallel to its conveying plane, and that the suction bars can be projected towards the workpiece at right-angles to the conveying plane of the suction belt conveyor in the gaps between the suction belts beyond the conveying plane and retracted behind same. In the apparatus of the invention, the web section hanging down beyond the clamping jaws is reliably held by the suction belt conveyor and moved thereby into the position in which it is received by the suction bars, lifted off the suction belt conveyor thereby and properly located on the workpiece disposed in the path of the suction bars. The suction belt conveyor may move continuously or intermittently. The transfer of the web section from the suction conveyor and its transport to the position in which it is lifted off by the suction bars is synchronised with the movement of the punch by means of control means. The suction air is likewise controlled in a manner such that the suction belt conveyor receives the web sections in a stretched form and the supply of suction air is interrupted when the suction bars lift the web section for transfer onto the workpiece.

The apparatus according to the invention can operate at a high speed because the transfer distances to be traversed by the suction bars between the suction belt conveyor and the workpiece are only short.

If the web section to be transferred is a label of plastics film, which is to be connected to the workpiece that is held in readiness and that is also of plastics film, the punch may in addition be provided with welding bars that can be pressed on the workpiece. In this way the web sections can be connected to the workpiece at the same time as they are applied thereto without the need for additional sequences of movement that would prolong the operating cycle.

The suction bars may be spring-mounted and can be pressed against the spring force into the plane of the welding bars so that when the punch is retracted the welding bars are first lifted off the weld seams and the suction bars still press the web section against the workpiece. This effectively avoids adhesion of the web sections to the welding bars.

In a further development of the invention, to divert the web to a vertical direction the conveying nip of the pair of feed rollers is disposed in a vertical plane, the clamping jaws being disposed to both sides of this plane and the conveying plane of the vertically downwardly conveying suction belt conveyor likewise being in registry with this plane. This arrangement is particularly advantageous for applying internal locks to the pulled-open base squares of cross-bottoms because the double belt conveyors which feed and clamp between each other the tube sections at the ends of which the cross-bottoms are formed to make the sacks can intersect the suction belt conveyor at right-angles and extend parallel to the conveying plane thereof, rails being provided to hold the pulled-open bases which are perpendicular to the tube section in the conveying plane of the suction belt conveyor and to support the backs of the bases.

To fix the corner folds of the pulled-open bases while the internal locks are being applied, there are spreadable flat jaws which can be introduced therein.

An example of the invention will now be described in more detail with reference to the drawing, wherein.

Figures 1, 3:
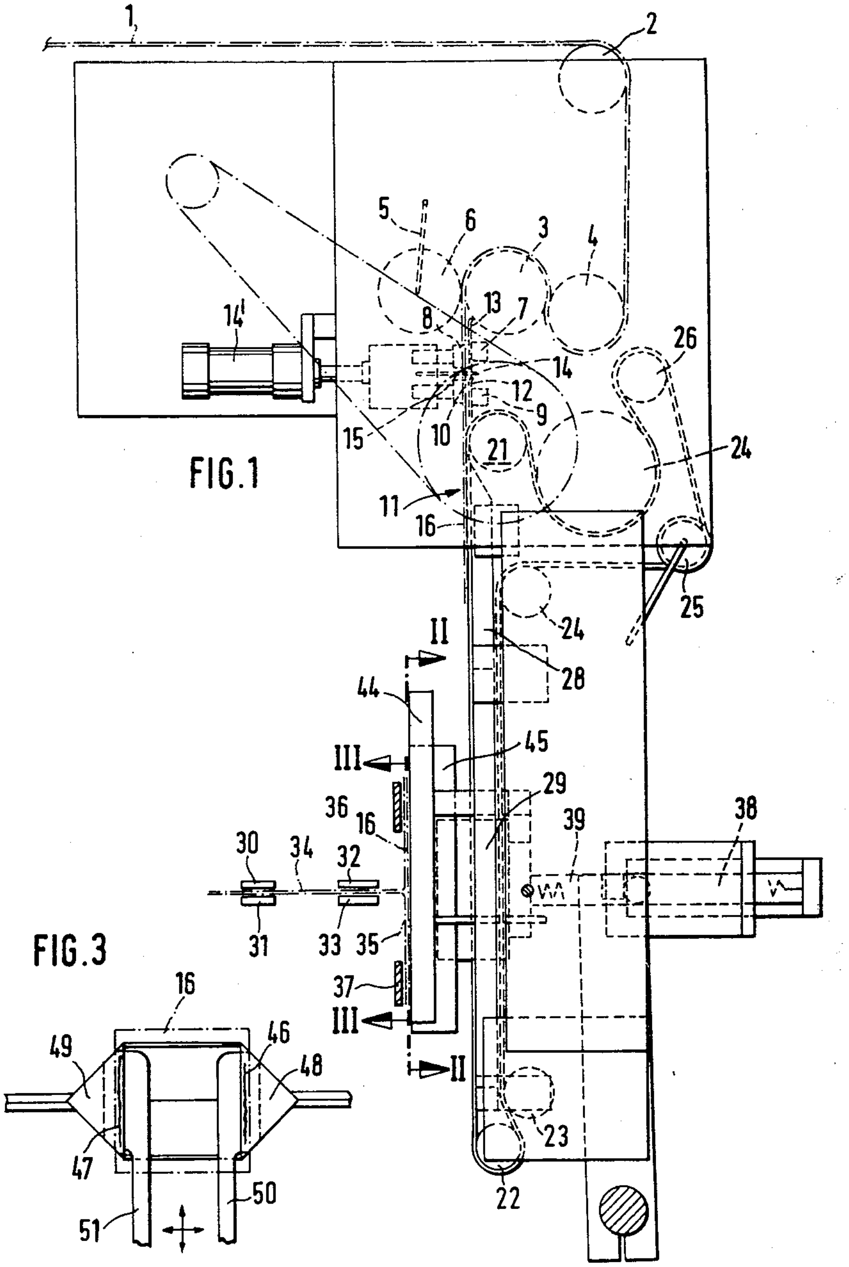
FIG. 1 is a diagrammatic side elevation of the apparatus for applying internal locks severed from a web withdrawn from a supply reel onto the pulled-open bases in the production of cross-bottom sacks.
FIG. 2 is an elevation of the FIG. 1 apparatus in the direction of the arrows II—II and FIG. 3 is an elevation of the pulled-open cross-bottoms in the direction of the arrows III—III.
Figure 2:
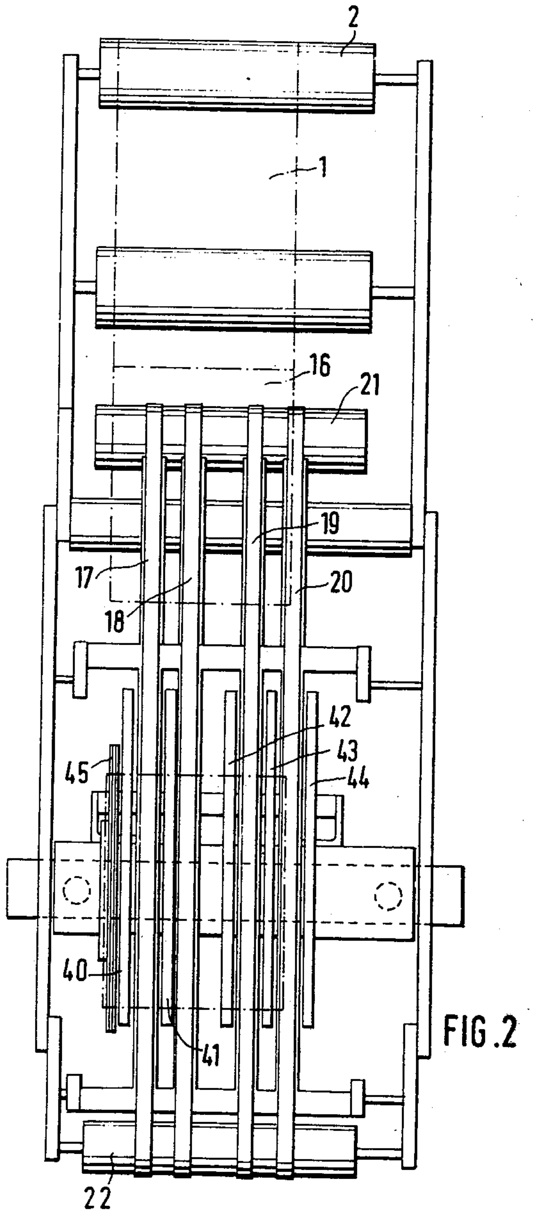

A web 1 of plastics internal locks runs over the direction-changing roller 2 to the S-feed which is formed by the driven rollers 3, 4 and advances it intermittently by the length of one section each time. To increase the friction between the web 1 of plastics internal locks and the roller 3, the latter can have applied to it a pressure roller 6 mounted at the end of a lever 5 pivoted to the machine frame. Between the rollers 3 and 5, the web 1 of plastics internal locks is diverted to a vertical direction.

Beneath the nip formed by the rollers 3, 6 there are clamping jaws 7, 9 which are fixed with respect to the frame and co-operate with movable clamping jaws 8, 10. The clamping jaws 8, 10 are connected by rods and connecting elements to the pneumatic piston-cylinder unit 14′ which press same against the clamping jaws 7, 9 and lift them therefrom in the sequence of the intermittent feed of the web 1 of plastics internal locks. The fixed clamping jaws 7, 9 are provided with guide plates 12, 13 for the web 1 of plastics internal locks, the guide plates being flanged at their inlet side.

A horizontal gap 14 is formed between the pair of clamping jaws 7, 8 on the one hand and the pair of clamping jaws 9, 10 on the other hand. In this gap, there is a knife 15 which severs sections 16 from the web 1 of plastics internal locks and is transversely displaceable by a drive (not shown).

A downwardly conveying suction belt conveyor 11 disposed beneath the clamping jaws has its conveying plane in registry with the plane of the closed clamping jaws and the roller nip. The spaced and parallel endless suction belts 17, 18, 19, 20 run over the driving drums 21, the direction-changing drum 22 as well as the guide rollers 23 to 27. Suction channels 28, 29 covered by the suction belts are arranged beneath the suction belts 17 to 20.

Horizontal double belt conveyors extend at a spacing from the suction belt conveyor 11 parallel to the conveying plane of the suction belt conveyor 11 and between their belts 30, 31 and 32, 33 they clamp tight a horizontally conveyed tube section 34 having a perpendicular base 35 which has been pulled open. To support the perpendicular pulled-open base, supporting rails 36, 37 are arranged behind it.

A punch horizontally reciprocatable by a pneumatic piston-cylinder unit 38 is provided at the level of the intermittently conveyed tube section 34; it runs in fixed guides and at the front it carries suction bars 40 to 44 disposed at both sides of the suction belts 17 to 20 and in gaps therebetween. The suction bars 40 to 44 can be moved through the conveying plane of the suction belt conveyor 11 and pulled back behind them. A welding bar 45 is connected to the punch 39 parallel to the suction bars 40 to 44 by means of supporting members.

To weld the section 16 that has been lifted off the suction belt conveyor 11 by the suction bars 40 to 44 onto the pulled-open base 35 there may be a further welding bar which is parallel to the welding bar 45 and connects the section 16 to the inner edges of the corner folds 48, 49 by means of the weld seams 46, 47. Before the weld seams are formed, profiled plates 50, 51 move into the corner folds 48, 49, stretch the pulled-open base and form the counterbearing for the welding bars.

In the illustrated example, the tube sections 34 with the perpendicular pulled-open bases 35 as well as the sections 16 forming the internal locks are conveyed in cycles so that application and welding of the sections 16 takes place during an interval when the suction belt conveyor 11 and the conveyor for the tube section 34 are at a standstill.

I claim:

1. Apparatus for applying a section severed from a web withdrawn from a supply reel onto a base of a flat-lying workpiece, comprising intermittently driven rollers for feeding the web to clamping jaws, clamping jaws arranged at both sides of a web feed path, said jaws being displaceable towards and away from each other and respectively divided to define a gap which extends transversely to the feeding direction of the web, a knife guided in the gap for severing web sections, and conveyor means disposed downstream of the clamping jaws, as viewed in the direction of web feed, for bringing a severed section to a position in which transfer means receive the section, transfer means for placing a severed section on a base (35) of a flat-lying workpiece (34), the conveyor means comprising a suction belt conveyor means (11) with a plurality of spaced parallel suction belts (17 to 20), and the transfer means comprising a punch (39) carrying at is front suction bars (40 to 44) which are parallel to the suction belts (17 to 20), means for holding the base (35) spaced from the suction belt conveyor means (11) in a plane parallel to a conveying plane of the suction belt conveyor means (11), and the suction bars (40 to 44) being movable towards the base (35) at right-angles to the conveying plane of the suction belt conveyor means (11) in gaps between the suction belts (17 to 20) beyond the conveying plane and retracted behind same.

2. Apparatus according to claim 1, characterised in that the punch (39) is provided with at least one welding bar (45) which can be pressed on the base (35).

3. Apparatus according to claim 2, characterised in that the suction bars (40 to 44) are spring-mounted and can be pressed against the spring force into the plane of the at least one welding bar (45).

4. Apparatus according to one of claims 1 to 3, characterised in that to divert the web to a vertical direction the conveying nip of the feed rollers (3, 6) is disposed in a vertical plane, the clamping jaws (7–10) are disposed to both sides of this plane, and the conveying plane of the vertically downwardly conveying suction belt conveyor means (11) is likewise in registry with this plane.

5. Apparatus according to claim 4, further comprising double belt conveyors (30, 31; 32, 33) for clamping and feeding workpieces (34), said double belt conveyors being spaced apart in pairs to define a conveying path for workpieces (34) which intersects the suction belt conveyor means (11) at right-angles, and rails (36, 37) extending parallel to the conveying plane of the suction belt conveyor means (11) for supporting backs of the bases.

6. Apparatus according to claim 5, characterised in that to fix corner folds (48, 49) of bases (35) while the severed sections are being applied, there are spreadable flat jaws (50, 51) which can be introduced into the bases to pull open and support the bases during welding.

7. Apparatus according to claim 1 or 2, characterised in that suction boxes (28, 29) providing the suction belts (17–20) with suction air in sections are provided under the suction belts.

* * * * *